United States Patent [19]

Sevadis

[11] Patent Number: 4,854,425

[45] Date of Patent: Aug. 8, 1989

[54] SELF-ENERGIZING DISC BRAKE SHOE

[76] Inventor: Robert Sevadis, 3721 Parkview Ave., Pittsburgh, Pa. 15213

[21] Appl. No.: 808,283

[22] Filed: Dec. 12, 1985

Related U.S. Application Data

[63] Continuation-in-part of Ser. No. 658,502, Nov. 5, 1984, abandoned.

[51] Int. Cl.$^4$ ............................................... B62L 1/12
[52] U.S. Cl. ................................ 188/72.2; 188/73.1; 188/216; 188/250 B
[58] Field of Search .................. 188/72.2, 72.3, 250 B, 188/216, 73.1

[56] References Cited

U.S. PATENT DOCUMENTS

| | | | |
|---|---|---|---|
| 3,860,094 | 1/1975 | Breton | 188/72.2 X |
| 4,280,073 | 7/1981 | Miller | 188/72.2 X |
| 4,333,550 | 6/1982 | Shirai | 188/72.2 |

Primary Examiner—Andres Kashnikow
Assistant Examiner—Matthew C. Graham
Attorney, Agent, or Firm—William J. Ruano

[57] ABSTRACT

A self-energizing disc brake shoe assembly for vehicles. It comprises a pair of relatively slidable and tapered blocks, each containing return springs surrounding rigid stems mounted in recesses of the blocks. One block serves as the backing plate and the other, as a self-energizing brake shoe. When the two blocks and a brake lining mounted on the brake shoe, engage the disc of a brake, the blocks move relatively apart longitudinally against a wedging action which affects progressive braking on the disc brake shoe. Upon release of the brake, the two blocks, by virtue of their return springs, will return to a neutral position, that is, with the blocks nested together.

1 Claim, 1 Drawing Sheet

U.S. Patent
Aug. 8, 1989
4,854,425
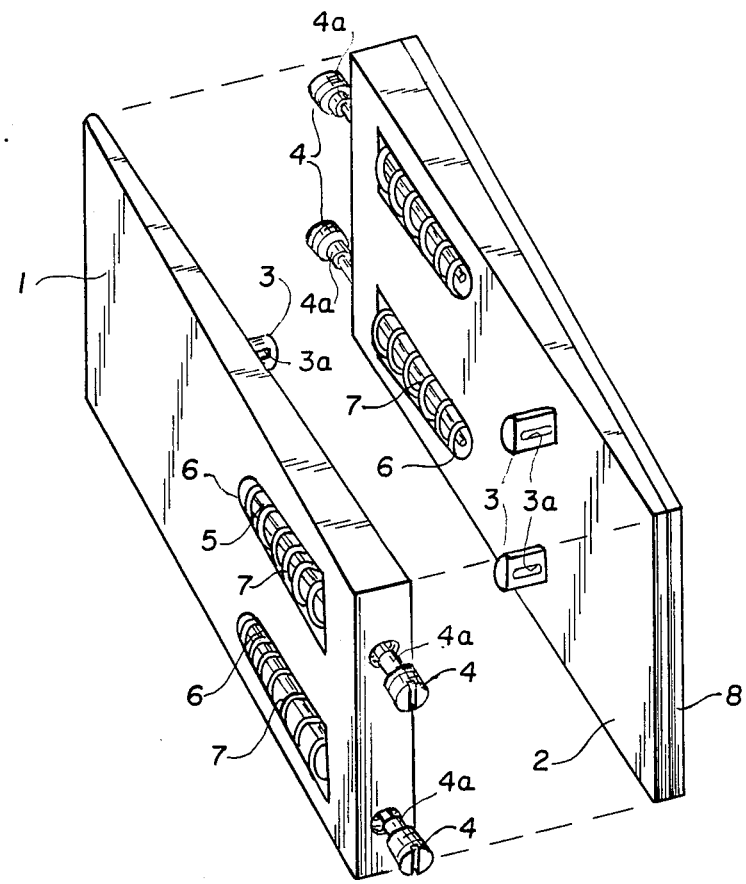
Fig. 1
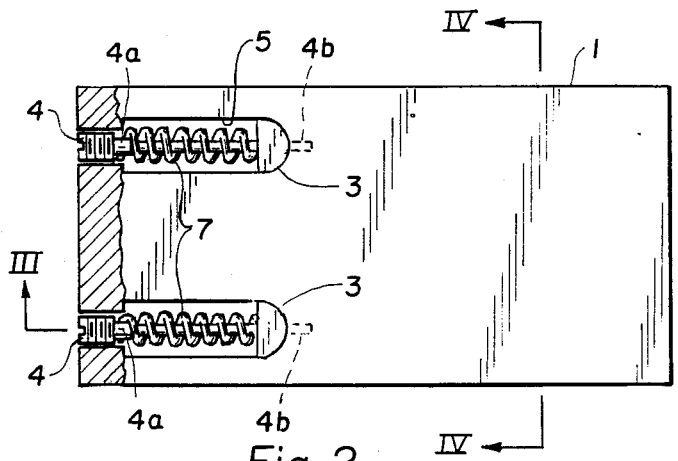
Fig. 2
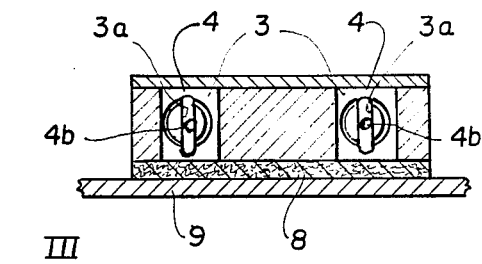
Fig. 4
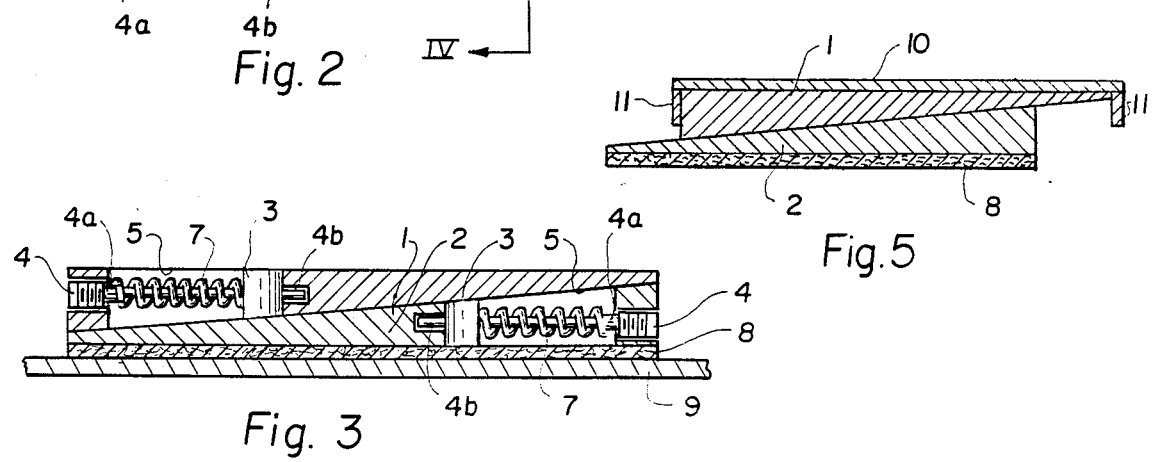
Fig. 5
Fig. 3

SELF-ENERGIZING DISC BRAKE SHOE

This invention is a continuation-in-part of my Patent application Ser. No. 06/658,502, filed Nov. 5, 1984, now abandoned. It relates to brake shoes for disc brakes, and, more particularly, to a self-energizing disc brake shoe.

BACKGROUND OF THE INVENTION

Disc brake shoes presently used require the application of considerable mechanical force and require power operation, including hydraulic cylinders, etc. U.S. Pat. No. 3,860,094, dated Jan. 14, 1975, and U.S. Pat. No. 4,333,550, dated June 8, 1982, exemplify the prior art with complicated and expensive return spring assemblies.

SUMMARY OF THE INVENTION

An object of the present invention is to overcome the objections of presently used disc brakes by providing a self-energizing brake shoe with a highly improved and simplified return spring assembly.

BRIEF DESCRIPTION OF THE DRAWING

Other objects and advantages of the invention will become more apparent from a study of the following description taken with the accompanying drawing wherein:

FIG. 1 is an exploded, perspective view of two components of the brake shoe assembly embodying the present invention;

FIG. 2 is an elevational view of the backing plate of FIG. 1;

FIG. 3 is a cross-sectional view taken along the line III—III of FIG. 2;

FIG. 4 is a cross-sectional view taken along the line IV—IV of FIG. 2 and

FIG. 5 is a central longitudinal section of FIG. 2 with recepticale 10 and after displacement of parts 1 and 2.

DESCRIPTION OF THE PREFERRED EMBODIMENT

Referring more particuarly to FIG. 1, numeral 1 denotes a tapered backing plate, and numeral 2 denotes a self-energizing tapered brake shoe embodied in the present invention. The backing plate 1 has two pairs of integral projections 3, which are adapted to engage the ends of springs 7 and which snugly surround shoulders 4a and surround stems 4b of threaded plugs 4 screwed into the self-energizing brake shoe 2 through slot 3a. Likewise, brake shoe 2 has two pairs of integral projections 3, which engage the ends of springs 7 snugly surrounding shoulders 4a and surround stems 4b of the threaded plugs 4 screwed into the backing plate 1 as shown in FIG. 2. The longitudinal relative sliding movement between the backing plate 1 and brake shoe 2, when they are together as shown in FIG. 3, is resisted by the compression of return springs 7,7 in each shoe, as will appear more clearly in FIGS. 2 and 3. Numeral 9 (FIG. 4) denotes a disc brake which engages the brake lining 8, which lining is rigidly attached to brake shoe 2. A backing plate 1 is held and stationarily on a vehicle by receptacle 10 having stops 11 shown in FIG. 5.

In operation, as the brake shoe 2 and lining 8 is moved against the fixed disc 9 of the car vehicle, it causes a wedging action which tends to longitudinally separate shoes 1 and 2. This separation is resisted by the return springs 7 of the respective shoes. Upon release of the brake by withdrawal of lining 8, the respective shoes 1 and 2, by virtue of the action of the return springs 7, will resume the position shown in FIG. 3. Thus, a self-energizing effect is obtained. These return springs 7,7 may be removed by unscrewing the threaded plugs 4.

Thus it will be seen that I have provided an efficient self-energizing disc brake of relatively simple construction; therefore, inexpensive to manufacture, and yet, which provides a self-energizing effect.

While I have illustrated and described a single specific embodiment of my invention, it will be understood that this is by way of illustration only and that various changes and modifications may be contemplated in my invention within the scope of the following claims.

I claim:

1. A self-energizing disc brake assembly comprising a rectangular receptacle, having end flanges, a backing plate mounted in said receptacle, a brake shoe, said backing plate and brake shoe being longitudinally tapered to effect wedging application of said brake shoe, a pair of pockets extending from the longitudinal ends of said backing plate and brake shoe to less than half the lengths thereof, each pocket containing a stem having a threaded head screw threaded to a threaded opening leading from the end of said backing plate and shoe into its pocket, and a helical return spring surrounding each of said stems, a pair of integral projections extending from the confronting surfaces of said plate and brake shoe having radial openings which surround said stems, and being positioned and shaped so as to be seated in the ends of said pockets whereby movement of said brake shoe against a disc brake will cause relative longitudinal sliding between said backing plate and brake shoe resisted by the compression of said return springs.

* * * * *

UNITED STATES PATENT AND TRADEMARK OFFICE
CERTIFICATE OF CORRECTION

PATENT NO. : 4,854,425

DATED : August 8, 1989

INVENTOR(S) : Servadio

It is certified that error appears in the above-identified patent and that said Letters Patent is hereby corrected as shown below:

Title page, item [19]: "Sevadis" should read --Servadio-- item [76]: "Robert Sevadis" should read --Robert Servadio--.

Signed and Sealed this

Twenty-sixth Day of June, 1990

*Attest:*

HARRY F. MANBECK, JR.

*Attesting Officer*      *Commissioner of Patents and Trademarks*